Feb. 19, 1924.
O. YOUNGBLOOD
SEED HULLING DEVICE
Filed July 31, 1923    2 Sheets-Sheet 1
1,483,963
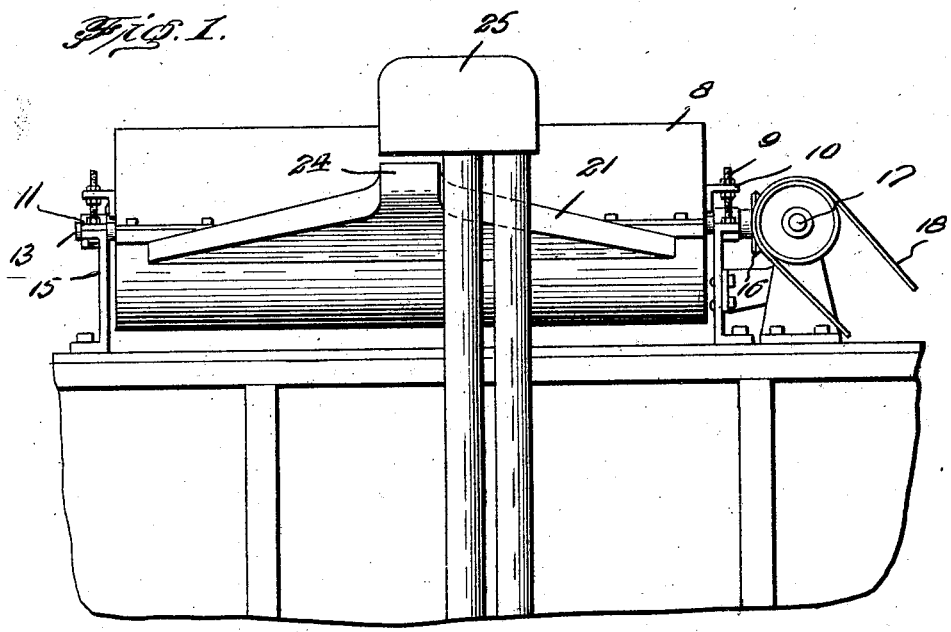
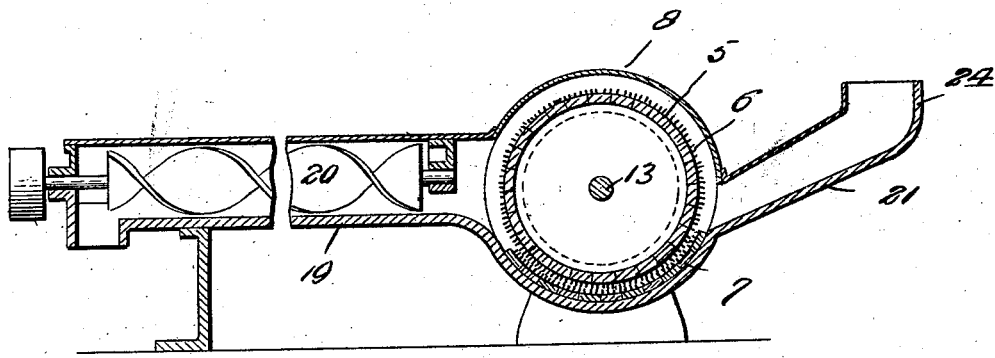
Witness.
F. C. Gibson.
Inventor
Orion Youngblood.
By Clarence O'Brien
Attorney Feb. 19, 1924. 1,483,963
O. YOUNGBLOOD
SEED HULLING DEVICE
Filed July 31, 1923 2 Sheets-Sheet 2

Witness
F. C. Gibson

Inventor
Orion Youngblood
By Clarence A. O'Brien
Attorney

Patented Feb. 19, 1924.

1,483,963

UNITED STATES PATENT OFFICE.

ORION YOUNGBLOOD, OF BOONVILLE, INDIANA.

SEED-HULLING DEVICE.

Application filed July 31, 1923. Serial No. 654,806.

*To all whom it may concern:*

Be it known that I, ORION YOUNGBLOOD, a citizen of the United States, residing at Boonville, in the county of Warrick and State of Indiana, have invented certain new and useful Improvements in Seed-Hulling Devices, of which the following is a specification.

This invention relates to certain new and useful improvements in seed hulling devices, and the primary object of the invention is to provide an attachment for wheat separators by means of which clover, alfalfa, grass seed, etc., may be hulled.

Another object of the invention is to provide a device of the above kind which embodies the desired qualities of simplicity and durability of construction, and ease of manufacture and operation.

Briefly described, the attachment embodies a feed chute adapted to be located beneath the discharge end of the usual weigher, a hulling device to receive the material from the chute, and a conveyor to carry the material from the hulling device and deliver it to a recleaner.

With the above general objects in view, and others that will become apparent as the nature of the invention is better understood, the same consists in the novel form, combination and arrangement of parts hereinafter more fully described, shown in the accompanying drawings and claimed.

In the drawings wherein like reference characters indicate corresponding parts throughout the several views, Figure 1 is an end elevational view of an attachment constructed in accordance with the present invention and shown applied to a threshing machine.

Figure 3 is a central longitudinal sectional view of the device.

Figure 2:
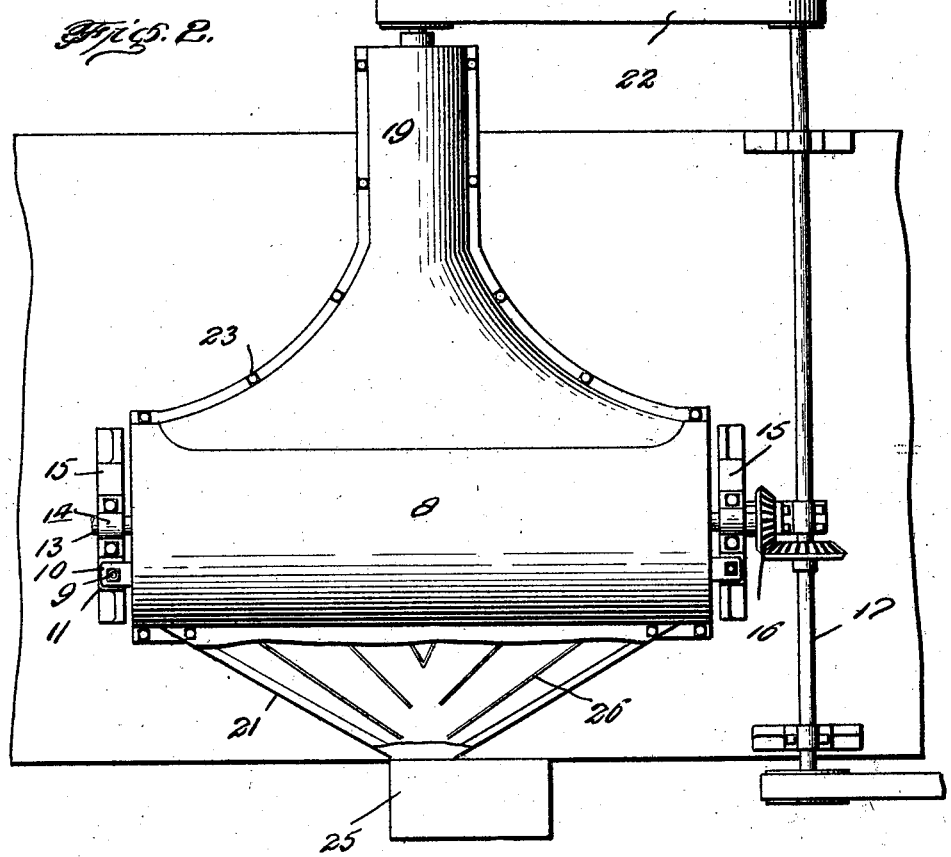
Figure 2 is a top plan view of the device shown in Figure 1, partly broken away.
Figure 4:
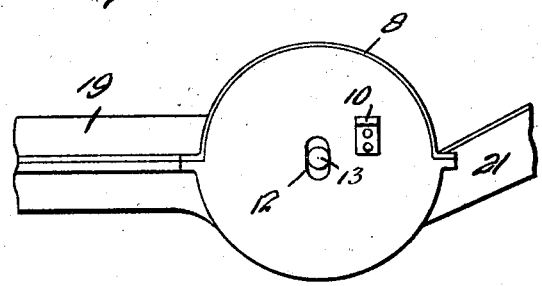
Figure 4 is a fragmentary side elevational view of the same with parts removed.
Figure 5:
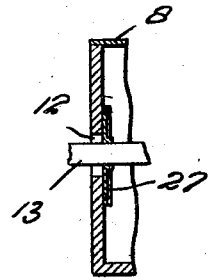
Figure 5 is a fragmentary sectional view of one end of the threshing cylinder casing to illustrate a detail of the invention.

Referring more in detail to the drawings, the invention consists of a hulling drum 5 provided with peripheral pins or teeth 6 and cooperating with the inner surface of a stationary concave hulling member 7 which is also provided with teeth in a well known manner.

The drum and concave hulling member are disposed within a suitable casing 8 which is adjustable vertically by means of screws 9 associated with lugs 10 fixed to the ends of the casing, and brackets 11 suitably mounted upon the threshing machine at the ends of the casing 8. Vertical movement of the casing 8 is permitted by the provision of vertically elongated slots 12 in the ends thereof through which the shaft 13 of the drum 5 projects, the ends of this shaft being suitably mounted in bearings 14 carried by brackets 15 that are mounted at the ends of the casing 8. By thus adjusting the casing, the concave member 7 may be moved toward and away from the lower portion of the cylinder 5 so as to adjust these parts the required distance apart for obtaining best results in accordance with the nature of the material being hulled.

The drum 5 is preferably driven by a bevel gearing 16 at one end of the shaft 13, one of the bevel gears being placed upon the shaft 17 extending at right angles to the shaft 13 and suitably mounted in bearings upon the threshing machine, as well as suitably driven by means of the belt gearing at one end as at 18 from a drive shaft of the threshing machine.

The casing 8 is preferably in the form of a casting having the shape of a cross in plan with the central portion of the casting of cylindrical form to accommodate the cylinder or drum 5, the end portions of the casting being respectively formed to provide a casing as at 19 for a spiral conveyor 20 and to provide a flared feed chute 21. The conveyor 20 is arranged within the casing portion 19 and is adapted to be rotated by means of belt gearing 22 from the adjacent end of the shaft 17, and the inner end of the portion 19 is flared so that the material may be readily discharged from the hulling drum to the conveyor 20 along the entire length of said drum. Preferably the casing is formed of separable sections, the upper ones of which are removably held in place by screws 23, or the like, so that access may be readily had to the interior for repair or cleaning purposes.

The feed chute 21 inclines toward the drum 5 and its outer end is upturned as at 24 so as to receive the material from the discharge spout 25 of the usual weigher provided upon threshing machines. Also, the chute 21 is of flared form so as to deliver the material to the drum along its entire length, and in order to insure even distribution of the material to the drum, the chute 21 is provided with diverging partitions as shown at 26 in Figure 2.

In order to prevent escape of the material through the ends of the casing or through the slots 12 thereof, suitable slides 27 are mounted upon the shaft 13 so as to cover said slots 12 at all positions of the casing adjustments.

The unhulled seed after passing through the separator to the weigher is discharged from the weigher into the chute 21 and the latter conveys the same onto the concave member 7. This seed is then effectively hulled when the drum 5 is placed into operation and the material is then discharged in the path of the conveyor 20 which carries it to the other side of the separator so as to deliver it to the recleaner. The device is preferably provided with suitable supporting legs or brackets which are adapted to be fastened to the separator by means of bolts, or the like, so as to permit easy removal of the device.

A device constructed in accordance with the above will serve as a valuable adjunct to threshing machines as it is possible to thresh both grain and seed.

From the foregoing description it is believed that the construction and operation, as well as the advantages of the present invention, will be readily understood and appreciated by those skilled in the art.

Minor changes may be made without departing from the spirit and scope of the invention as claimed.

What I claim as new is:

1. A hulling attachment for a separating machine, or the like, comprising a casing of substantial cross shape in plan with the central portion thereof of cylindrical form, a toothed concave member mounted upon the lower part of said central cylindrical portion, a toothed drum mounted within said cylindrical portion and cooperating with said concave member for hulling seed, a rotary conveyor in one end of the casing to receive the material from the hulling drum and to convey it to one side of the separator, and means to rotate said drum and said conveyor, the other end of said casing being in the form of a flared inclined chute adapted to receive material from the discharge end of a weigher of the wheat separating machine, and diverging partitions within said chute for distributing the material evenly along the entire length of the drum.

2. A hulling attachment for a separating machine, or the like, comprising a casing of substantial cross shape in plan with the central portion thereof of cylindrical form, a toothed concave member mounted upon the lower part of said central cylindrical portion, a toothed drum mounted within said cylindrical portion and cooperating with said concave member for hulling seed, a rotary conveyor in one end of the casing to receive the material from the hulling drum and to convey it to one side of the separator, and means to rotate said drum and said conveyor, the other end of said casing being in the form of a flared inclined chute adapted to receive material from the discharge end of a weigher of the wheat separating machine, and diverging partitions within said chute for distributing the material evenly along the entire length of the drum, the casing being flared at the inner end of the conveyor to insure discharge of material from the hulling drum to the conveyor along the entire length of said drum.

3. A hulling attachment for a separating machine, or the like, comprising a casing of substantial cross shape in plan with the central portion thereof of cylindrical form, a toothed concave member mounted upon the lower part of said central cylindrical portion, a toothed drum mounted within said cylindrical portion and cooperating with said concave member for hulling seed, a rotary conveyor in one end of the casing to receive the material from the hulling drum and to convey it to one side of the separator, and means to rotate said drum and said conveyor, said last-named means comprising a shaft arranged at right angles to the hulling drum and having its intermediate portion geared to the latter, means at one end of said shaft for facilitating application of power thereto, and means at the other end of said shaft for transmitting rotation of the same to the conveyor.

4. A hulling attachment for a separating machine, or the like, comprising a casing of substantial cross shape in plan with the central portion thereof of cylindrical form, a toothed concave member mounted upon the lower part of said central cylindrical portion, a toothed drum mounted within said cylindrical portion and cooperating with said concave member for hulling seed, a rotary conveyor in one end of the casing to receive the material from the hulling drum and to convey it to one side of the separator, means to rotate said drum and said conveyor, and means to adjust the casing and concave member vertically relative to the hulling drum to regulate the distance between said concave member and said drum.

In testimony whereof I affix my signature.

ORION YOUNGBLOOD.